United States Patent
Oh et al.

(10) Patent No.: US 7,336,703 B2
(45) Date of Patent: Feb. 26, 2008

(54) DEVICE AND METHOD FOR MEASURING A RECEIVED SIGNAL POWER IN A MOBILE COMMUNICATION SYSTEM

(75) Inventors: Jeong-Tae Oh, Seoul (KR); Jae-Hyok Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 647 days.

(21) Appl. No.: 10/879,078

(22) Filed: Jun. 30, 2004

(65) Prior Publication Data

US 2005/0069065 A1  Mar. 31, 2005

(30) Foreign Application Priority Data

Jun. 30, 2003  (KR) ............... 10-2003-0043843

(51) Int. Cl.
*H04B 3/46* (2006.01)
(52) U.S. Cl. .................. 375/227; 375/296
(58) Field of Classification Search ........ 375/222, 375/232, 227, 346, 350, 296, 206; 455/522
See application file for complete search history.

(56) References Cited

U.S. PATENT DOCUMENTS

| | | | | |
|---|---|---|---|---|
| 5,640,385 A | * | 6/1997 | Long et al. | 370/335 |
| 5,844,936 A | * | 12/1998 | Lesthievent | 375/148 |
| 6,034,989 A | * | 3/2000 | Kochi et al. | 375/150 |
| 6,459,727 B1 | * | 10/2002 | Cho et al. | 375/222 |
| 2002/0196876 A1 | * | 12/2002 | Takada | 375/346 |

FOREIGN PATENT DOCUMENTS

| | | |
|---|---|---|
| EP | 862280 | 9/1998 |
| JP | 58-017734 | 2/1983 |
| JP | 06-141019 | 5/1994 |
| JP | 09-325713 | 12/1997 |
| JP | 2000-244365 | 9/2000 |
| JP | 2002-271234 | 9/2002 |
| JP | 2002-528991 | 9/2002 |
| WO | WO 00/25436 | 5/2000 |
| WO | 00-46929 | 8/2000 |
| WO | 02-067444 | 8/2002 |

* cited by examiner

*Primary Examiner*—Mohammed Ghayour
*Assistant Examiner*—Sonia J King
(74) *Attorney, Agent, or Firm*—Roylance, Abrams, Berdo & Goodman, L.L.P.

(57) ABSTRACT

A device and method for measuring power of a received broadband signal including narrowband interference in a mobile communication system is provided. An interference eliminator removes the narrowband interference from the received broadband signal through a filter. A power compensator calculates a compensation value for compensating for at least one portion of the received signal removed when the narrowband interference was removed. A received power measurement unit measures power of the received signal received from the interference eliminator, and compensates for a measurement error in the measured power due to the removed at least one portion using the compensation value, and then outputs the received broadband signal having the compensated power.

9 Claims, 5 Drawing Sheets

DEVICE AND METHOD FOR MEASURING A RECEIVED SIGNAL POWER IN A MOBILE COMMUNICATION SYSTEM

PRIORITY

This application claims the benefit under 35 U.S.C. § 119(a) of an application entitled "DEVICE AND METHOD FOR MEASURING RECEIVED SIGNAL POWER IN MOBILE COMMUNICATION SYSTEM", filed in the Korean Intellectual Property Office on Jun. 30, 2003 and assigned Serial No. 2003-43843, the contents of which are incorporated herein by reference.

BACKGROUND OF THE INVENTION

1. Field of the Invention

The present invention relates to a broadband mobile communication system. More particularly, the present invention relates to a device and method for measuring received signal power in a receiver of a mobile communication system where narrowband interference is present.

2. Description of the Related Art

A mobile communication system provides a communication service to a terminal with assigned wireless frequency resources. However, a variety of possible interference in the wireless environment may cause performance degradation of the mobile communication system and may also disable the system in a worst case scenario. Thus, there is a need to provide a solution to address the interference.

Interference in a mobile communication system is generally divided into interference between the same frequencies and interference between nearby frequencies. The interference between the same frequencies includes interference between base stations and interference caused by another system such as an illegal radio station. The interference between nearby frequencies includes interference between base stations in the same system using nearby frequencies and interference between adjacent systems.

The most significant interference in the current broadband mobile communication system is perhaps strong narrowband interference caused by another system using the same frequency resources. The narrowband interference in the mobile communication system may cause system performance degradation and communication blackout.

On the other hand, the mobile communication system measures power of received signals to allow system control based on states of the signals. Specifically, accurate power measurement of the received signals allows effective calculation of reverse link load, which makes it possible to control user access and transfer rates in the reverse link. Accurate received signal power measurement also contributes to an increase in the mobile communication system capacity and also to effective resource management. The configuration of a receiver in the mobile communication system, which measures received signal power, will now be described in detail with reference to FIG. 1.

FIG. 1 is a block diagram illustrating a conventional receiver of the mobile communication system.

As shown in FIG. 1, the receiver includes an antenna 10, a received RF processor 20, a modem 30 and a received power measurement unit 40. The received RF processor 20 converts an RF signal received through the antenna 10 into a baseband signal in order to demodulate the received RF signal. The modem 30 demodulates the converted baseband signal. The received power measurement unit 40 measures power levels of the received signal. The received RF processor 20 filters the received RF signal to obtain a signal in a desired band, and converts the obtained signal into an intermediate frequency signal and then into a baseband signal. The received power measurement unit 40 measures received signal power for performing a Rise Over Thermal (ROT) function for controlling user access and transfer rates in a communication system such as a Code Division Multiple Access 200 First Evolution Data Only (CDMA 2000 1x EV-DO).

Broadband and narrowband signals coexist in such a receiver. FIG. 2 is a graph showing frequency characteristics of the coexisting broadband and narrowband signals in the conventional receiver. It can be seen from FIG. 2 that a broadband signal 50 and narrowband signals 61, 62 and 63 share the same frequency resources. However, the narrowband signals serve as interference signals to the broadband signal. If high power signals such as the narrowband interference signals use the same frequency resources used by the broadband signal, communication blackout is caused. Receipt of the narrowband interference signals having high power also causes abnormal measurement results. To overcome these problems, attempts have been made to use interference elimination filters for removing narrowband interference signals interfering with the system, thereby reducing system performance degradation. Despite these attempts, there are still difficulties in accurately measuring the received signal power.

SUMMARY OF THE INVENTION

Therefore, the present invention has been made in view of the above problems, and it is an object of the present invention to provide a device and method for correctly measuring received signal power even when narrowband interference is present in a mobile communication system.

It is another object of the present invention to provide a device and method for correctly measuring received signal power by compensating for a received power measurement error due to the removal of narrowband interference by an interference elimination filter in a mobile communication system.

In accordance with one aspect of the present invention, the above objects can be accomplished by the provision of a device for measuring a power level of a received broadband signal including a narrowband interference signal in a broadband mobile communication system. The device comprises an interference eliminator for removing the narrowband interference signal from the received broadband signal through at least one filter and then outputting the received broadband signal; a power compensator for calculating a compensation value for compensating for at least one portion of the received broadband signal, said at least one portion being removed with the removal of the narrowband interference signal; and a received power measurement unit for measuring power of the received broadband signal output from the interference eliminator, and compensating for the measured power of the received broadband signal for the removed at least one portion using the compensation value output from the power compensator, and then outputting the received broadband signal having the compensated power.

In accordance with another aspect of the present invention, there is provided a method for measuring a power level of a received broadband signal including a narrowband interference signal in a broadband mobile communication system. The method comprising removing the narrowband interference signal from the received broadband signal through at least one filter and outputting the received broadband signal; calculating a compensation value for compensating for at least one portion of the received broadband signal, said at least one portion being removed with the removal of the narrowband interference signal; and measuring power of the received broadband signal from which the narrowband interference signal is removed, and compensating for the measured power of the received broadband signal for the removed at least one portion using the calculated compensation value, and then outputting the received broadband signal having the compensated power.

BRIEF DESCRIPTION OF THE DRAWINGS

The above and other objects, features and other advantages of the present invention will be more clearly understood from the following detailed description taken in conjunction with the accompanying drawings, in which.

Throughout the drawings, it should be noted that the same or similar elements are denoted by like reference numerals.

DETAILED DESCRIPTION OF THE PREFERRED EMBODIMENTS

Embodiments of the present invention will now be described in detail with reference to the accompanying drawings. In the following description, a detailed description of known functions and configurations incorporated herein will be omitted for conciseness.

Figure 1:
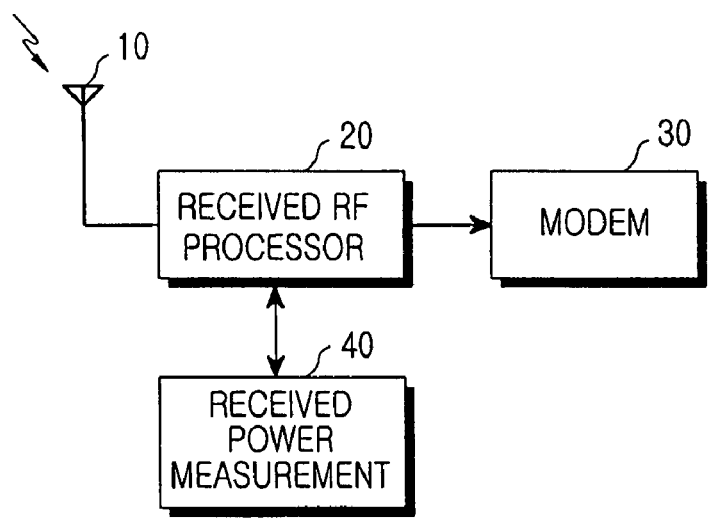
FIG. 1 is a block diagram illustrating a conventional receiver in a mobile communication system.
Figure 2:
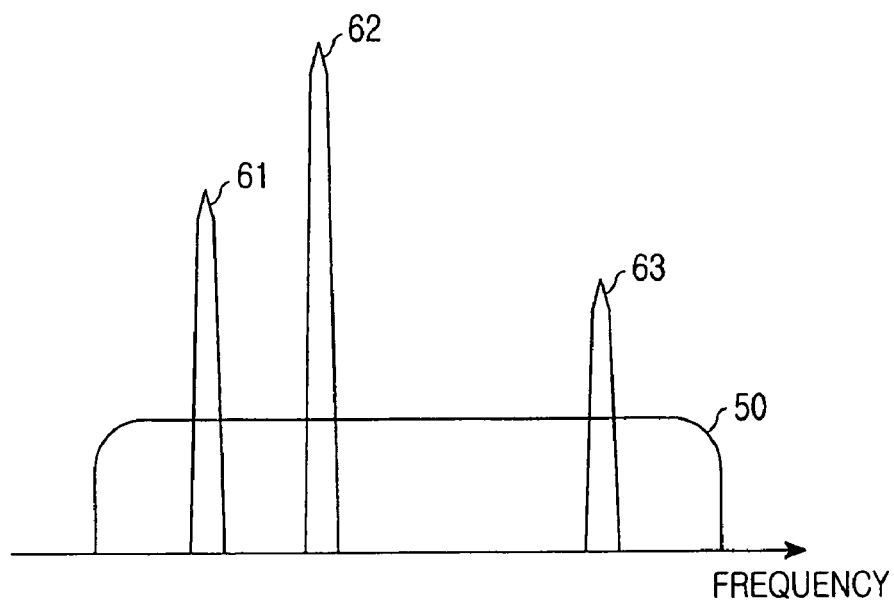
FIG. 2 is a graph illustrating frequency characteristics of coexisting broadband and narrowband signals in a conventional receiver.
Figure 3:
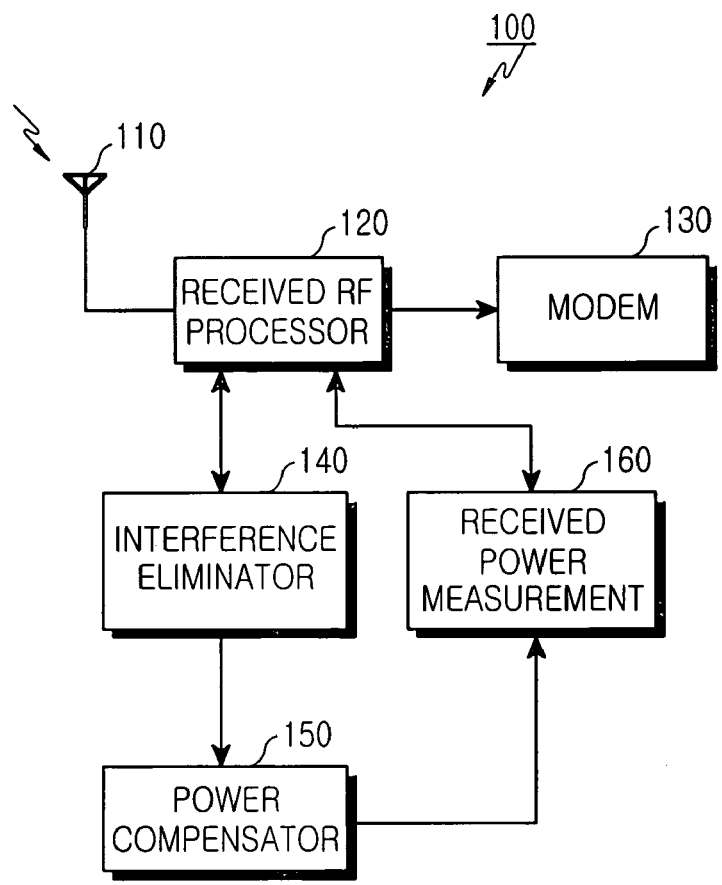
FIG. 3 is a block diagram illustrating a receiver of a mobile communication system according to an embodiment of the present invention.

FIG. 3 is a block diagram illustrating a receiver of a mobile communication system according to an embodiment of the present invention.

As shown in FIG. 3, the receiver 100 includes an antenna 110, a received radio frequency (RF) processor 120, a modem 130, an interference eliminator 140, a power compensator 150 and a received power measurement unit 160.

The received RF processor 120 filters a received RF signal to obtain a signal in a desired band for demodulating the received RF signal in the modem 130, and converts the filtered signal into an intermediate frequency signal and then into a baseband signal. The received RF processor 120 transmits the received signal, in which narrowband interference signals and a broadband signal coexist, to the interference eliminator 140. The received signal input to the interference eliminator 140 may be an RF, intermediate frequency (IF) or baseband signal depending on filter type.

Figure 4:
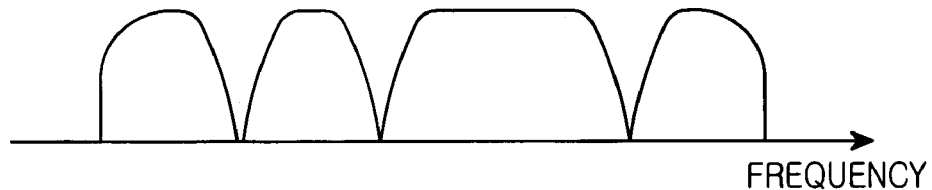
FIG. 4 is a graph illustrating a broadband signal deformed due to the removal of narrowband interference signals in the receiver according to the embodiment of the present invention.

The interference eliminator 140 removes a narrowband interference signal from the signal received from the received RF processor 120. In an embodiment of the present invention, an interference signal is removed using an analog filter at an analog (RF/IF) stage via the interference eliminator 140. In another embodiment of the present invention, an interference signal is removed using a digital filter at a baseband stage via the interference eliminator 140. FIG. 4 is a graph showing frequency characteristics of a received broadband signal from which narrowband interference signals are removed by the interference eliminator 140. As shown in FIG. 4, when the narrowband interference signals are removed, part of the broadband signal is also removed.

The power compensator 150 receives the narrowband interference signals from the interference eliminator 140 for calculating a received signal power measurement error. The received power measurement error corresponds to the power level of the removed received broadband signal.

Figure 5:
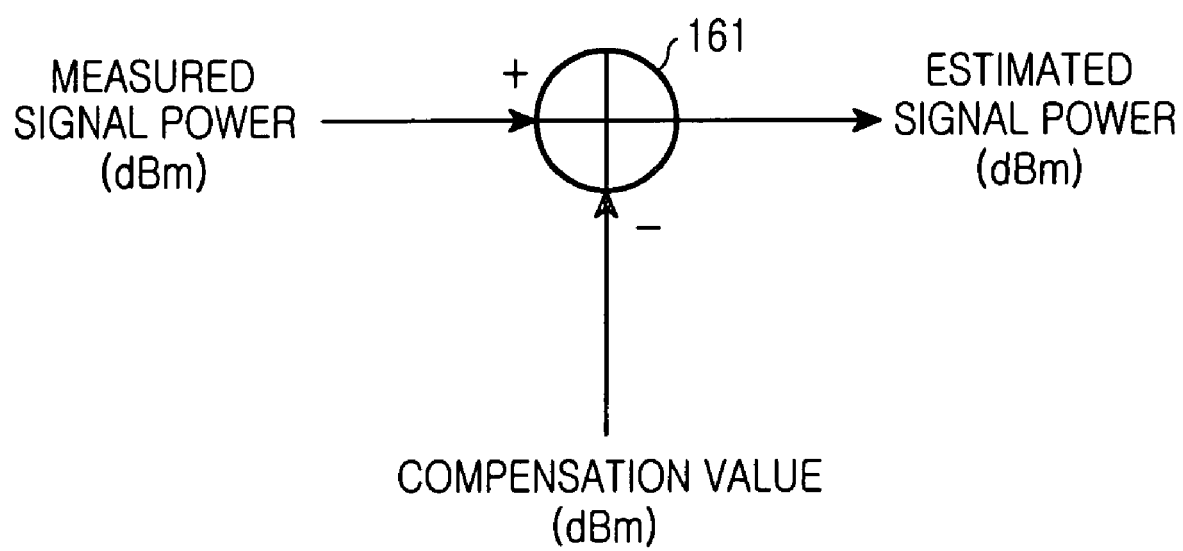
FIG. 5 is a schematic diagram illustrating a received power measurement unit in the receiver according to an embodiment of the present invention.

The received power measurement unit 160 measures power levels of the received broadband signal (i.e., the signal output from the interference eliminator 140) using a power meter (not shown), and receives the calculated power measurement error from the power compensator 150, and then compensates for the measured received signal power for the power measurement error. The configuration of the received power measurement unit 160 is well known in the art and thus a detailed description thereof will be omitted. FIG. 5 illustrates the basic configuration of the received power measurement unit 160 according to an embodiment of the present invention. As shown in FIG. 5, the received power measurement unit 160 includes a subtractor 161, which subtracts the measurement error (dBm) calculated by the power compensator 150 from the measured received signal power (dBm), and outputs the subtracted signal as the compensated signal power (dBm).

The configuration of the power compensator 150, which calculates the measurement error value which is used to compensate for the signal power measured by the received power measurement unit 160, will now be described in detail with reference to the drawings.

Figure 6A:
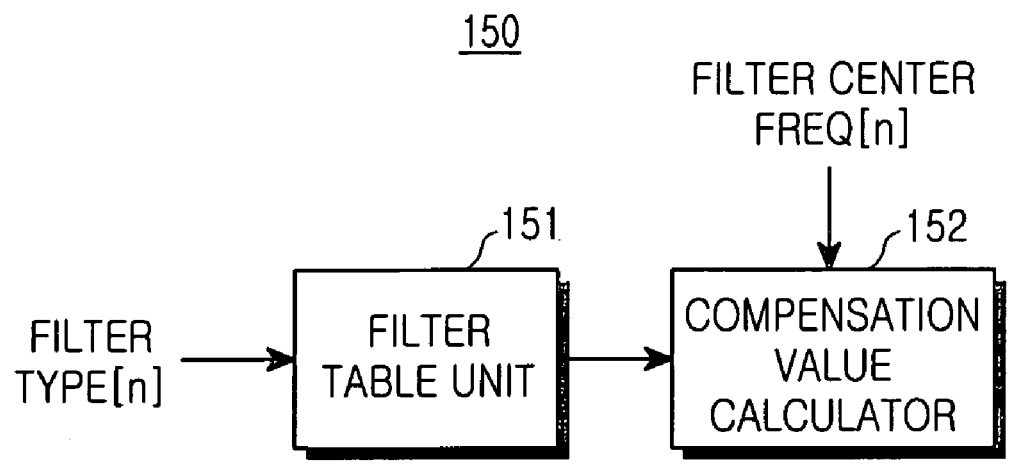
FIGS. 6A and 6B are block diagrams showing in detail a power compensator in the receiver according to the embodiment of the present invention.
Figure 6B:
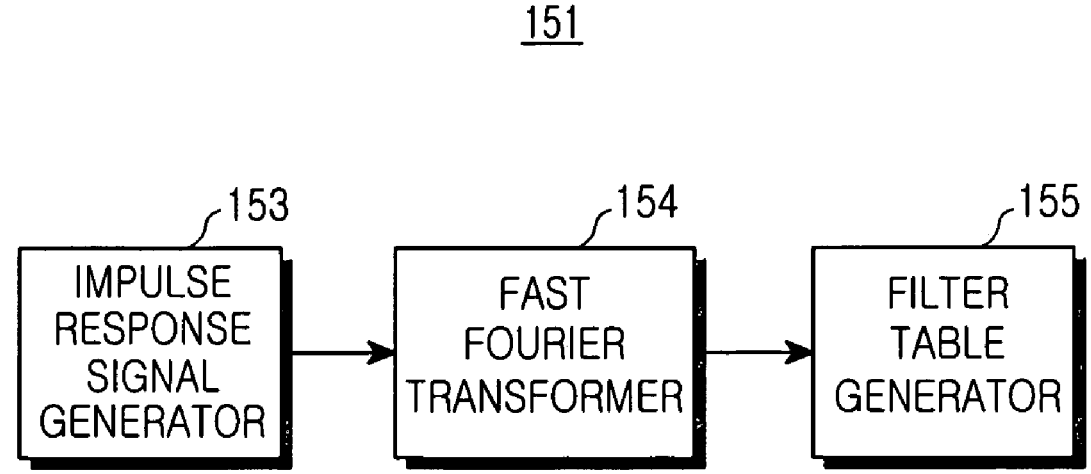

FIGS. 6A and 6B are block diagrams showing in detail the power compensator 150 in the receiver according to an embodiment of the present invention.

As shown in FIG. 6A, the power compensator 150 includes a filter table unit 151 and a compensation value calculator 152. The filter table unit 151 receives information on the type of filter used in the interference eliminator 140 from the interference eliminator 140, and the compensation value calculator 152 receives information on a center frequency $f_0$ of the filter from the interference eliminator 140. The power compensator 150 selects a filter table, corresponding to the type of filter currently selected by the interference eliminator 140, from preset filter tables based on filter information received from the interference eliminator 140, which indicates the type of filter currently selected by the interference eliminator 140 from M filters, where "M" is the maximum number of filters.

The compensation value calculator 152 receives the filter center frequency information from the interference eliminator 140 and receives the selected filter table and the number of filters used therein from the filter table unit 151, and then calculates a compensation value used to compensate for the power measurement error of the received signal (i.e., to compensate the received broadband signal for the portions removed along with the removal of the narrowband interference signals).

The configuration of the filter table unit 151 for generating the preset filter tables will now be described in detail with reference to FIG. 6B.

The filter table unit 151 includes an impulse response signal generator 153, a fast Fourier transformer (FFT) 154 and a filter table generator 155.

The impulse response signal generator 153 generates an impulse response signal of a filter used in the interference eliminator 140. For an analog (RF/IF) interference elimination filter, the impulse response signal generator 153 generates an impulse response signal in direct current (DC) form (i.e., an impulse response signal having a constant output value) at its center frequency in the baseband frequencies using approximate digital filter coefficients. For a digital interference elimination filter, the impulse response signal generator 153 generates an impulse response signal in DC form at its center frequency in the baseband frequencies using digital filter coefficients.

The fast Fourier transformer 154 receives N impulse response signals from the impulse response signal generator 153 and performs fast Fourier transform on the received signals. This makes it possible to obtain characteristics of the filter with respect to N frequency components The filter table generator 155 receives signals output from the fast Fourier transformer 154 and generates a filter table having N frequency components for the filter used in the interference eliminator 140. If M filters having different characteristics are simultaneously used in the interference eliminator 140, the filter table generator 155 generates M filter tables, each having N components.

The receiver configured as described above measures received signal power in the following manner.

A high frequency signal received through the antenna 110 is converted into a baseband signal through the received RF processor 120. The received radio frequency (RF), intermediate frequency (IF) or baseband signal is transferred from the received RF processor 120 to the interference eliminator 140. The interference eliminator 140 removes narrowband interference signals from the signal received from the received RF processor 120, and transfers the broadband signal, from which the narrowband interference signals are removed, to both the power compensator 150 and the received RF processor 120. The power compensator 150 calculates a power measurement error of the signal from which the narrowband interference signals are removed, and then transfers the calculated power measurement error as a compensation value to the received power measurement unit 160. The received power measurement unit 160 receives the output signal of the narrowband interference eliminator 140 from the received RF processor 120, and then measures the power of the received output signal (i.e., the broadband signal from which narrowband signals, corresponding to the center frequencies of filters used in the narrowband interference eliminator 140, are removed). The received power measurement unit 160 subtracts the compensation value from the measured signal power and then outputs the subtracted signal as the compensated power. This allows power of the broadband signal to be compensated for the portions that were removed with the removal of the narrowband interference signals. The operation of the receiver for calculating the compensation value will now be described in detail with reference to the drawings.

Figure 7:
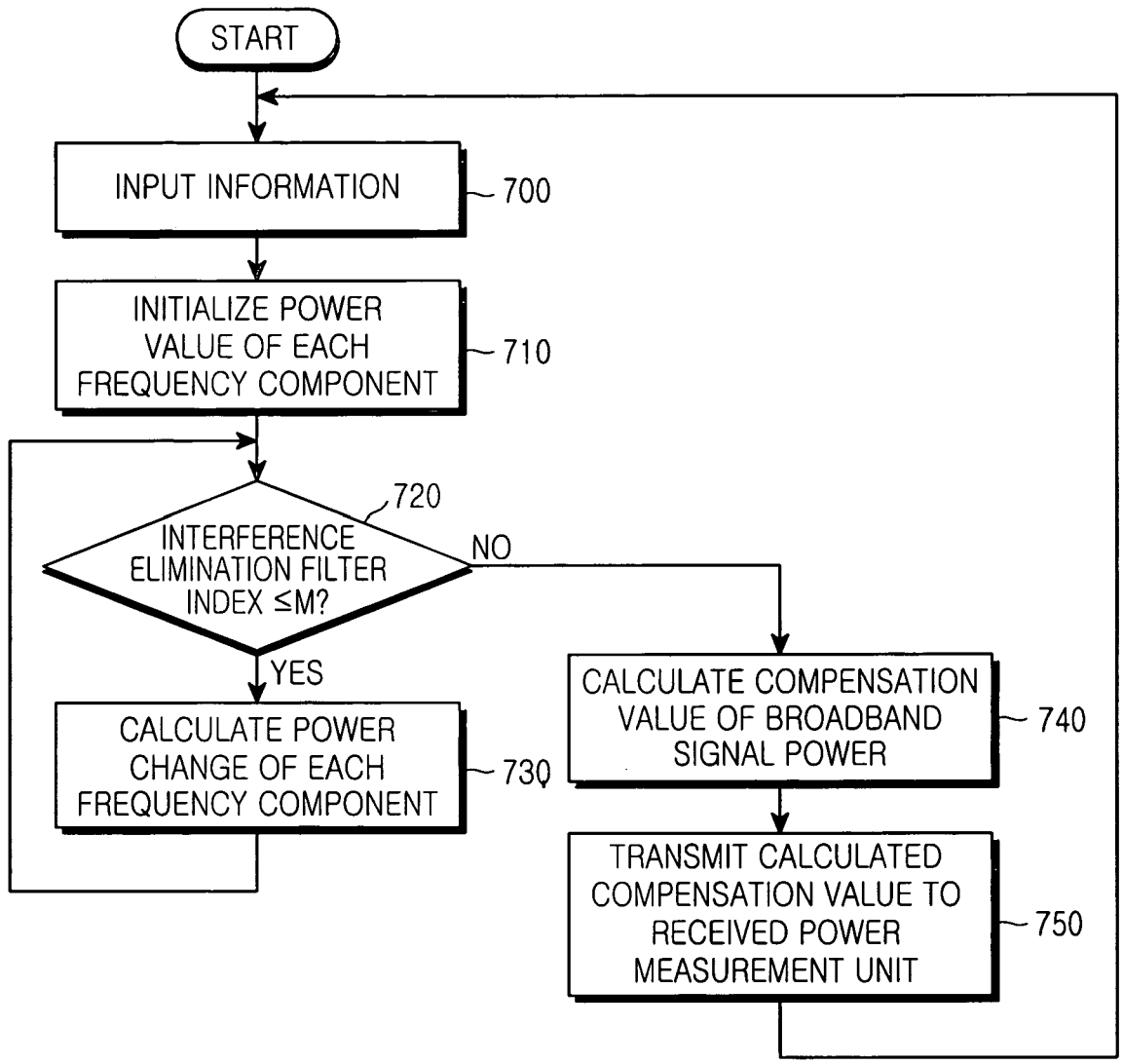
FIG. 7 is a flow chart illustrating a method for calculating a compensation value for compensating for measurement error in the received signal power in order to achieve accurate measurements according to an embodiment of the present invention.

FIG. 7 is a flow chart illustrating a method for calculating a compensation value for compensating for measurement error in the received signal power in order to achieve accurate measurements according to an embodiment of the present invention. The number of interference elimination filters used in the interference elimination unit 140 is set to M and a filter table length (i.e., the number of frequency components of each filter) is set to N.

As shown in FIG. 7, at step 700, the compensation value calculator 152 in the power compensator 150 receives information required for the compensation value calculation. The information includes the number of filters used for the narrowband interference removal, a filter center frequency and a filter table selected based on a filter type received from the interference eliminator 140.

At step 710, the compensation value calculator 152 sets N power values [0 to (N−1)] of the N frequency components to 1 (i.e., initializes the power value of each frequency component). Power value [n] indicates a power value of the n-th frequency component of the broadband signal, and "n" is in the range of 0 to N−1, where "N" denotes the number of frequency components or the total power value of the broadband signal (i.e., the sum of power of the "N" frequency components of the broadband signal).

At step 720, the compensation value calculator 152 compares the index number of a corresponding interference elimination filter with the preset number of filters (M). If the compared result is that the index number of the corresponding filter is smaller than or equal to the preset number of filters (M), the compensation value calculator 152 calculates a change in the power of each frequency component of the filter at step 730. That is, the compensation value calculator 152 updates a filter table of a filter by shifting the position of a filter table, generated to be suitable for the center frequency for the impulse response signal in DC form, to a center frequency of the filter, and then calculates the power change by multiplying the updated filter table [n] by each component of the power value [n] as expressed below in Equation 1. The procedure then returns to step 720 to calculate a change in the power of each frequency component of the next interference elimination filter. Accordingly, the power value of a frequency component affected by the used interference elimination filter is changed, whereas the power values of frequency components not affected thereby are maintained at a value of 1 as set above.

$$\text{Power}[n] = \text{power}[n] \times \text{FilterTable}[n] \, (n=0 \sim N-1) \quad \text{Equation 1}$$

On the other hand, if the compared result at step 720 is that the index number of the filter is larger than the preset number of filters (M), i.e., if the power change of each frequency component of all of the filters is calculated, the procedure moves to step 740.

At step 740, the compensation value calculator 152 sums the reduced power ratios (i.e., changed power values) of the filters calculated by Equation 1 and calculates the compensation value of the broadband signal power based on the sum of the reduced power ratios as expressed in Equation 2.

Equation 2

$$CompensationValue(\text{dB}) = 10 \times \log_n \left( \sum_{n=0}^{n-1} \text{Power}[n]/N \right)$$

The calculation of $$\log_n \left( \sum_{n=0}^{n-1} \text{Power}[n]/N \right)$$

in Equation 2 obtains a reduced power ratio of the broadband signal after the narrowband interference is removed by the interference eliminator 140, and "N" denotes the total power of the broadband signal.

At step 750, the compensation value calculator 152 transmits the compensation value calculated by Equation 2 to the received power measurement unit 160, and then returns to step 700.

As apparent from the above description, the embodiments of the present invention provide a device and method for measuring a received signal power in a mobile communication system, in which the power of a received broadband signal is compensated for the portions removed with the removal of narrowband interference signals from the received broadband signal. This allows more accurate power measurement of received signals, thereby increasing the capacity of the mobile communication system and also achieving effective communication resource management.

Although certain embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the above embodiments, but defined by the accompanying claims as well as equivalents thereof.

What is claimed is:

1. A device for measuring a power level of a received broadband signal including a narrowband interference signal in a broadband mobile communication system, the device comprising:

an interference eliminator for removing the narrowband interference signal from the received broadband signal through at least one filter and then outputting the received broadband signal;

a power compensator for calculating a compensation value for compensating for at least one portion of the received broadband signal, said at least one portion being removed with the removal of the narrowband interference signal; and a received power measurement unit for measuring power of the received broadband signal output from the interference eliminator, and compensating for the measured power of the received broadband signal for the removed at least one portion using the compensation value output from the power compensator, and then outputting the received broadband signal having the compensated power.

2. The device according to claim 1, wherein the power compensator includes:

a filter table unit for selecting a filter table used for power change calculation from preset filter tables based on filter information received from the interference eliminator; and a compensation value calculator for calculating power change of the selected filter table and the compensation value.

3. The device according to claim 2, wherein the filter table unit includes:

an impulse response signal generator for generating an impulse response signal of said at least one filter;

a fast Fourier transformer for receiving the generated impulse response signal and performing fast Fourier transform on the received signal; and a filter table generator for generating a filter table having filter characteristics of a predetermined number of frequency components obtained using the Fourier transformed signal.

4. The device according to claim 1, wherein the received power measurement unit includes a subtractor for subtracting the compensation value from the measured power of the received broadband signal.

5. A method for measuring a power level of a received broadband signal including a narrowband interference signal in a broadband mobile communication system, the method comprising the steps of:

removing the narrowband interference signal from the received broadband signal through at least one filter and outputting the received broadband signal;

calculating a compensation value for compensating for at least one portion of the received broadband signal, said at least one portion being removed along with the removal of the narrowband interference signal; and measuring power of the received broadband signal from which the narrowband interference signal is removed, and compensating for the measured power of the received broadband signal for the removed at least one portion using the calculated compensation value, and then outputting the received broadband signal having the compensated power.

6. The method according to claim 5, wherein said calculating further comprises:

selecting a filter table used for power change calculation from preset filter tables based on filter information of said at least one filter; and calculating power change of the selected filter table and the compensation value.

7. The method according to claim 5, wherein the compensation value is calculated by the following equation:

$$CompensationValue(\text{dB}) = 10 \times \log_n \left( \sum_{n=0}^{n-1} \text{Power}[n]/N \right),$$

where $$\sum_{n=0}^{n-1} \text{Power}[n]/N$$

corresponds to a reduced power ratio of the broadband signal after the narrowband interference signal is removed, and power denotes a power change of an n-th frequency component, and N denotes a total power value of the broadband signal.

8. The method according to claim 6, wherein said selecting step further comprises:

generating an impulse response signal of said at least one filter;

receiving the generated impulse response signal and performing fast Fourier transform on the received signal; and generating a filter table having filter characteristics of a predetermined number of frequency components obtained using the Fourier transformed signal.

9. The method according to claim 5, wherein at said measuring step further comprises:

subtracting the compensation value from the measured power of the received broadband signal.

* * * * *